Patented Dec. 12, 1933

1,938,731

UNITED STATES PATENT OFFICE 1,938,731

RUBBERLIKE MASS CONTAINING STYRENE POLYMERIZATES

Eduard Tschunkur and Walter Bock, Cologne-Mulheim-on-the-Rhine, Germany, assignors to I. G. Farbenindustrie Aktiengesellschaft, Frankfort-on-the-Main, Germany No Drawing. Original application July 10, 1930, Serial No. 467,126. Divided and this application May 15, 1933, Serial No. 671,284, and in Germany July 20, 1929

8 Claims. (Cl. 260—6)

The present invention relates to a process of preparing artificial mixed rubber-like masses and to the new mixed rubber-like masses obtainable by said process.

The process of manufacture of the artificial rubber-like masses is effected by causing complete interpenetration of the polymerization product of a butadiene hydrocarbon, more particularly, of a hydrocarbon of the probable formula:—

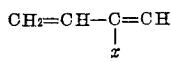

wherein $x$ means hydrogen or methyl, with a polymerization product of an olefine benzene, such as styrene, alpha-alkyl-styrenes

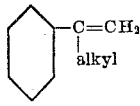

polyvinylbenzenes and nuclear homologues of these compounds etc. The complete interpenetration of the butadiene hydrocarbon polymerizate and the olefine benzene polymerizate is advantageously effected by mixing the different hydrocarbons and causing polymerization of the mixture either by simple heating, for example, to about 40–80° C., or in emulsion with water and an emulsifying agent or an emulsoid colloid, preferably while gently heating the emulsion to about 30 to 70° C. and while shaking or stirring. Likewise, it will be possible to intimately mix incompletely polymerized butadiene hydrocarbons with incompletely polymerized olefine benzenes, which polymerization products should still possess a somewhat viscous character, by mechanical means, and causing further polymerization of the mixtures according to one of the processes above mentioned with or without the addition of a butadiene hydrocarbon and/or an olefine benzene hydrocarbon. Obviously, our mixed polymerizates can also be obtained by previously polymerizing a butadiene hydrocarbon, then adding an olefine benzene hydrocarbon and further polymerizing according to one of the methods described above or vice versa.

It may be mentioned that in the claims the expression "effecting complete interpenetration" of the various polymerizates is intended to include the modifications defined above. Obviously, also such processes are within the scope of this expression in which ingredients are employed which are known to favorably influence the polymerization processes in question, such as oxygen, substances splitting off oxygen under the conditions of working, metal oxides, electrolytes and the like.

The different hydrocarbons or the incompletely polymerized products should be employed in such amounts that the finished rubber-like masses contain below about 45% by weight of the olefine benzene polymerizate. The best results are generally obtained when employing the olefine benzene hydrocarbon in an amount that the finished rubber-like masses contain between about 15 and about 40% by weight of the olefine benzene polymerizate.

Instead of the pure butadiene hydrocarbons or pure olefine benzenes the cheaper technical raw products or mixtures of butadiene with isoprene and/or mixtures of different olefine benzenes or incompletely polymerized products of these hydrocarbons may be employed in many cases with good results.

It will also be of advantage in some cases to add before or during the polymerization rather small amounts of other diolefine hydrocarbons, such as, 2.3-dimethylbutadiene, phenylbutadiene or the like, by which additions the character of the final products may be somewhat altered.

The mixed polymerization products thus obtainable are, in contradistinction to many other artificial rubber-like masses, plastic and easily workable on rollers. In consequence of this fact they easily take up fillers, such as soot, colloidal silicic acid, aluminium oxide, zinc oxide and the like, vulcanizing agents, such as sulfur, selenium, etc., vulcanization accelerators, phasticizing agents, dyestuffs and other ingredients usually applied in vulcanization processes. They yield, when vulcanized in the presence of a finely divided soot variety, vulcanizates of high technical value.

It may be mentioned that the formation of mixed polymerization products of pronounced and valuable rubber-like properties according to the present invention is most surprising, since olefine benzene polymerizates are generally resins and not rubber-like products.

Furthermore, it should be mentioned that the valuable rubber-like polymerization products described and claimed herein, are not obtained, when simply mixing completely polymerized products from butadiene or isoprene and from olefine benzene hydrocarbons; nor are the valuable polymerizates of the present invention obtained, when, for example, styrene or another olefine benzene hydrocarbon is polymerized in the presence of completely polymerized butadiene or isoprene or vice versa. Likewise, mixed polymerization products obtainable by mixing solutions of, for example, completely polymerized styrene with solutions of completely polymerized butadiene or isoprene and evaporating the solvent do not possess the valuable properties of our new rubber-like masses, it being a characteristic feature of the present invention that both the olefine benze component tnd the butadiene or isoprene component must still be polymerizable and must be polymerized in admixture with one another.

The following examples illustrate the invention, without limiting it thereto, the parts being by weight:—

Example 1

100 parts of butadiene are mixed with 50 parts of styrene, the mixture is emulsified by means of a solution of 15 parts of an emulsifying agent (for example, sodium stearate, sodium mono- or dialkyl-naphthalene sulfonate, with or without the addition of colloids, salts and the like) in 150 parts of water and polymerized, with or without agitation. After a few days an artificial latex is obtained, which after working up gives a good yield of a plastic, easily rollable polymerization product, which can be converted by vulcanization in the presence of carbon black into a valuable vulcanization product possessing the properties of soft rubber.

When using in this example a mixture of 150 parts of butadiene with 20 parts of styrene, a mixed polymerization product is obtained possessing after vulcanization with the addition of lamp black especially high elasticity.

Example 2

120 parts of butadiene, 30 parts of styrene are emulsified in 150 parts of water with 7,5 parts of glue and 7,5 parts of the potassium salt of mono- or di-isobutyl-naphthalene sulfonic acid. The mixture is then polymerized, while stirring or at rest, at a temperature of about 50-60° C. After a few days, a mixed polymerizate separates for the most part in a solid form possessing high grade rubber-like properties.

Rubber-like masses of good quality may be likewise obtained by polymerizing according to the above mentioned method a mixture of 110 parts of butadiene, 20 parts of 2.3-dimethyl-butadiene and 20 parts of styrene, or a mixture of 113 parts of isoprene and 37 parts of styrene.

Example 3

120 parts of butadiene and 30 parts of styrene are emulsified with 120 parts of water, 7 parts of the hydrochloric acid salt of diethylaminoethyl-oleylamide and 30 parts of acetic acid of 30% strength. This mixture is polymerized for a few days at a temperature of 40-60° C. A latex-like emulsion, yielding after coagulation a plastic rubber-like mass of high-grade soft rubber properties is thus obtained.

Example 4

50 parts of butadiene are emulsified with 15 parts of alpha-methylstyrene, 6 parts of the chlorohydrate of diethylaminoethyloleylamide, 60 parts of water and the mixture is caused to polymerize while shaking or stirring at a temperature of about 60° C. for 4-5 days. The polymerizate formed is isolated in the usual manner and thus obtained in a yield of about 85% of the theoretical amount.

Example 5

A mixture of 100 parts of butadiene and 50 parts of a strongly unsaturated product obtained by dehydrogenation of diethylbenzene and containing relatively large quantities of divinylbenzene, is emulsified with 12 parts of sodium stearate, 5 parts of dioxane end 150 parts of water. Polymerization is effected by shaking the emulsion at about 60° C. After working up the polymerization mixture in the usual manner, a plastic polymerizate of great technical value is obtained.

Example 6

A mixture of 400 parts of butadiene and 200 parts of styrene is polymerized for 6-8 weeks at a temperature of about 60° C. After that time the unpolymerized styrene is distilled off. There remains a very plastic mixed polymerizate, yielding vulcanizates of great technical value when vulcanized in the presence of carbon black.

This is a division of our co-pending application Serial No. 467,126, filed July 10, 1930.

We claim:—

1. The process which comprises effecting complete interpenetration of a heat or emulsion polymerizate derived from a compound of the probable formula

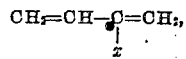

wherein $x$ stands for hydrogen or methyl, with a heat or emulsion polymerizate derived from a vinyl benzene hydrocarbon, in such a manner that the mixed polymerizate contains below about 45% by weight of the vinyl benzene polymerizate.

2. The process which comprises effecting complete interpenetration of the heat or emulsion polymerizate derived from a compound of the probable formula

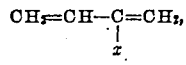

wherein $x$ stands for hydrogen or methyl, with a heat or emulsion polymerizate derived from a vinyl benzene hydrocarbon, in such a manner that the mixed polymerizate contains between about 15-40% by weight of the vinyl benzene polymerizate.

3. The process which comprises effecting complete interpenetration of a heat or emulsion polymerizate derived from a compound of the probable formula

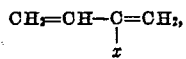

wherein $x$ stands for hydrogen or methyl, with a heat or emulsion polymerizate derived from styrene, in such a manner that the mixed polymerizate contains below about 45% by weight of the styrene polymerizate.

4. The process which comprises effecting complete interpenetration of a heat or emulsion polymerizate derived from a compound of the probable formula

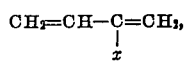

wherein $x$ stands for hydrogen or methyl, with a heat or emulsion polymerizate derived from styrene, in such a manner that the mixed polymerizate contains between about 15 and about 40% by weight of the styrene polymerizate.

5. The polymerization products obtained according to the process claimed in claim 1, said polymerization products possessing a good plasticity, easily taking up ingredients usually applied in vulcanization processes and yielding, when vulcanized in the presence of carbon black, vulcanization products of high tensile strength and superior resistance to abrasion.

6. The polymerization products obtained according to the process as claimed in claim 2, said polymerization products possessing a good plasticity, easily taking up ingredients usually applied in vulcanization processes and yielding, when vulcanized in the presence of carbon black, vulcanization products of high tensile strength and superior resistance to abrasion.

7. The polymerization products obtained according to the process as claimed in claim 3 said polymerization products possessing a good plasticity, easily taking up ingredients usually applied in vulcanization processes and yielding, when vulcanized in the presence of carbon black, vulcanization products of high tensile strength and superior resistance to abrasion.

8. The polymerization products obtained according to the process as claimed in claim 4, said polymerization products possessing a good plasticity, easily taking up ingredients usually applied in vulcanization processes and yielding, when vulcanized in the presence of carbon black, vulcanization products of high tensile strength and superior resistance to abrasion.

EDUARD TSCHUNKUR.
WALTER BOCK.